US012252361B2

(12) United States Patent
Johnsson (10) Patent No.: US 12,252,361 B2
(45) Date of Patent: Mar. 18, 2025

(54) DEVICE FOR FEEDING CARTON STACKS

(71) Applicant: Norden Machinery AB, Kalmar (SE)

(72) Inventor: Peter Johnsson, Ljungbyholm (SE)

(73) Assignee: Norden Machinery AB, Kalmar (SE)

( * ) Notice: Subject to any disclaimer, the term of this patent is extended or adjusted under 35 U.S.C. 154(b) by 80 days.

(21) Appl. No.: 18/004,236

(22) PCT Filed: Jul. 5, 2021

(86) PCT No.: PCT/SE2021/050682
§ 371 (c)(1),
(2) Date: Jan. 4, 2023

(87) PCT Pub. No.: WO2022/015219
PCT Pub. Date: Jan. 20, 2022

(65) Prior Publication Data
US 2023/0264906 A1    Aug. 24, 2023

(30) Foreign Application Priority Data

Jul. 16, 2020 (SE) .................................. 2050898-2

(51) Int. Cl.
*B65H 1/02* (2006.01)
*B31B 50/04* (2017.01)
(Continued)

(52) U.S. Cl.
CPC ........... *B65H 1/025* (2013.01); *B31B 50/042* (2017.08); *B65B 43/126* (2013.01);
(Continued)

(58) Field of Classification Search
None
See application file for complete search history.

(56) References Cited

U.S. PATENT DOCUMENTS 4,417,653 A    11/1983  Zwezerynen
5,350,055 A *  9/1994  Lecrone ................. B65G 19/02
198/732

(Continued)

FOREIGN PATENT DOCUMENTS

JP           6193026 A     5/1986
JP        2010-247901 A    4/2010
(Continued)

OTHER PUBLICATIONS

International Search Report and Written Opinion issued for International Patent Application No. PCT/SE2021/050682, dated Sep. 1, 2021 in 16 pages.

(Continued)

*Primary Examiner* — Kavel Singh
(74) *Attorney, Agent, or Firm* — Knobbe, Martens, Olson & Bear, LLP (57) ABSTRACT

A feeding device for feeding stacks of standing flat-folded cartons to a receiving station, comprising a conveyor track having a flat bearing plane adapted to support the stacks, where the conveyor track comprises at least two rows of teeth where each row of teeth comprises a plurality of spaced apart teeth adapted to support the stacks of flat-folded cartons, where the teeth can be positioned in either an erected position or in a folded position, and where the feeding device comprises a guide track arranged along the bearing plane adapted to hold the teeth in the selected position, and where the guide track ends at an end region of the conveyor track, such that the teeth are unsupported at the end region. The advantage of the invention is that stacks of flat-folded cartons can be merged continuously at an outfeed region.

11 Claims, 6 Drawing Sheets

(51) Int. Cl.
  *B65B 43/12* (2006.01)
  *B65B 59/00* (2006.01)
  *B65G 19/02* (2006.01)
  *B65H 1/28* (2006.01)

(52) U.S. Cl.
  CPC ............ *B65B 59/003* (2019.05); *B65G 19/02* (2013.01); *B65H 1/28* (2013.01); *B65H 2301/21* (2013.01); *B65H 2404/693* (2013.01)

(56) References Cited

U.S. PATENT DOCUMENTS

| | | | |
|---|---|---|---|
| 6,662,933 B2 * | 12/2003 | De Guglielmo | B65G 47/088 198/732 |
| 7,648,322 B2 | 1/2010 | Moncrief et al. | |
| 8,182,406 B2 | 5/2012 | Reuteler et al. | |
| 2001/0032775 A1 | 10/2001 | Guglielmo et al. | |
| 2002/0089114 A1 | 7/2002 | Ford et al. | |
| 2004/0245717 A1 | 12/2004 | Pfankuch | |

FOREIGN PATENT DOCUMENTS

| | | | |
|---|---|---|---|
| JP | 4844989 B2 * | 12/2011 | |
| WO | WO 1998/026985 A1 | 6/1998 | |
| WO | 2012/143724 A1 | 10/2012 | |

OTHER PUBLICATIONS

Swedish Office Action and Search Report issued for Swedish Patent Application No. 2050898-2, dated Feb. 19, 2021 in 10 pages.
Extended European Search Report issued in EP Application No. 21841231.0, dated Jul. 8, 2024.
Japanese Office Action issued in application No. 2023-501849 on Dec. 16, 2024.

* cited by examiner

DEVICE FOR FEEDING CARTON STACKS

CROSS-REFERENCE TO RELATED APPLICATIONS

This application is the U.S. National Phase under 35. U.S.C. § 371 of International Application PCT/SE2021/050682, filed Jul. 5, 2021, which claims priority to Swedish Patent Application No. 2050898-2, filed Jul. 16, 2020. The disclosures of the above-described applications are hereby incorporated by reference in their entirety.

TECHNICAL FIELD

The present invention relates to a device adapted to feed carton stacks to a carton unfolding machine, where a carton stack comprises standing flat-folded cartons or carton blanks. The device is adapted to feed carton stacks of different lengths and to merge them at an outfeed region. The device is to be used in the packing industry.

BACKGROUND ART

When articles are being packaged, it is often desirable to pack them either alone or together in separate packages. Thus, in highly automated packaging facilities, such articles may be transferred to cartons which are to serve as packaging for the article. These cartons are erected to form a final carton from flat-folded cartons prior to the packaging of the article in the carton. The flat-folded cartons normally arrives at the packing station in magazines comprising hundreds of flat-folded carton blanks, where the cartons are transferred from the magazine to a transport infeed conveyor that conveys the flat-folded cartons to the packing machine. A flat-folded carton is made from a carton blank that is glued together at a side portion, such that the side walls of the carton are connected to each other.

The cartons may be grouped in different ways in a magazine, depending on the type of carton. Some types of flat-folded cartons may constitute one large stack of flat-folded cartons, comprising hundreds of flat-folded cartons that are placed at the infeed conveyor at the same time. This type of flat-folded cartons are regular, rectangular flat-folded cartons, where both ends of the flat-folded carton have the same thickness. These can be stacked in large stacks without the upper or lower end of the stack being thicker than the other end. Some flat-folded cartons are delivered in smaller stacks, e.g. a type referred to as a five panel carton having a protruding double layered display panel that extends from the back panel of the carton, adapted for an additional display area of the product or to provide a hanging possibility for the product. The double layer is glued together, which makes the display panel thicker than the rest of the flat-folded carton. This type of flat-folded cartons are thus delivered in smaller stacks, comprising e.g. around 50 flat-folded cartons.

The feeding conveyor is preferably provided with protruding holding teeth adapted to hold a stack of flat-folded cartons. The stacks of flat-folded cartons may be fed from the magazine to the conveyor either manually or by a pick-up device. The pick-up device picks up a stack of flat-folded cartons from the magazine and positions it between the holding teeth of the conveyor. The distance between the holding teeth is decided by the size of the carton stack. For a regular large stack of flat-folded cartons, the distance between the holding teeth may be up to 500 mm and more, and for a stack of flat-folded five panel cartons, the distance between the holding teeth may be around 100 mm.

When the infeed conveyor is to convey differently sized flat-folded carton stacks, the distance between the holding teeth must be changed. In some conveyors, the distance between the middle tooth and the outer teeth of a conveyor may be changed. This solution is mainly adapted to hold erected cartons of different widths, where the width does not differ very much. For greater distances, it is known to remove some of the teeth, e.g. every other tooth, in order to provide a greater distance between the holding teeth. It is also possible to replace the conveyor belt or chain with another conveyor belt or chain having teeth with the required distance. This solution is not very flexible.

U.S. Pat. No. 8,182,406 B2 discloses a machine adapted to feed partially formed cartons of different sizes. The machine comprises an overhead conveyor having foldable lugs, where each lug may be selectively actuated to either extend out from the conveyor in order to convey a carton, or to be folded in. US 2001/0032775 A1 discloses an adjustable system for conveying single carton blanks, comprising a plurality of pusher elements. Each pusher element can be set either in an inactive position in which the pusher is located below the transportation surface or in an active position in which it projects from the transportation surface. It is possible to erect a selected number of pusher elements in a periodic manner in order to adapt the system for differently sized carton blanks. An active pusher element leaves the transportation surface before the end region of the transport track, such that the carton blank is released and can be transferred to a receiving station.

While these solutions work well in certain situations, there is still room for improvements in order to achieve a flexible feeding device for flat-folded carton stacks having different sizes.

DISCLOSURE OF SUMMARY OF THE INVENTION

An object of the invention is to provide an improved device for feeding and merging carton stacks of different sizes.

The solution to the problem according to the invention is described in the present disclosure regarding the feeder device and the method. The claims contain advantageous further developments of the feeding device and the method.

In a feeding device for feeding stacks of standing flat-folded cartons to a receiving station, comprising a conveyor track having a flat bearing plane adapted to support the stacks, where the conveyor track comprises at least two rows of teeth where each row of teeth comprises a plurality of spaced apart teeth adapted to support the stacks of flat-folded cartons, where the teeth can be positioned in either an erected position or in a folded position, and where the feeding device comprises a guide track arranged along the bearing plane and adapted to hold the teeth in the selected position, the object of the invention is achieved in that the guide track ends at an end region of the conveyor track, such that the teeth are unsupported at the end region.

By this first embodiment of a feeding device according to the invention, a feeding device that can convey stacks of flat-folded cartons having different lengths to a receiving station is provided, such that the feeding device can be adapted for different types of flat-folded cartons. The stacks of flat-folded cartons are merged at an outfeed region of the feeding device in a continuous manner. Some flat-folded cartons, such as regular rectangular flat-folded cartons, will have substantially the same thickness over the complete folded carton, which makes it possible to stack these in relatively long stacks, comprising up to 100 cartons or more. Such a stack of flat-folded cartons may have a length of up to 500 mm or more. Other types of flat-folded cartons, such as five panel cartons having an additional display panel, the thickness over the folded carton varies, with a greater thickness at the display panel. These flat-folded cartons can only be stacked in shorter stacks, e.g. comprising 50 cartons or less. Since the stack will somewhat resemble a fan, a longer stack will be difficult to handle without additional support of the stack.

The feeding device comprises at least two rows of teeth spaced apart with a predefined distance. The distance between two teeth in a row preferably corresponds to the shortest stack of flat-folded cartons that will be used, and may e.g. be 100 mm. The teeth of each row are attached to a conveyor chain, where the conveyor chain of each row is driven in parallel with the other conveyor chains. The conveyor chains forms a conveyor track on which the stacks of flat-folded cartons stand, supported by the teeth. The conveyor track conveys the stacks from an infeed region, in which the stacks are inserted between the teeth, either manually by an operator, or by a placing device, e.g. an industrial robot. The stacks are conveyed to an outfeed region, where the stacks are merged to each other in a continuous flow. At the outfeed region, the teeth are unsupported by the feeding device and can thus be supported by the stacks of flat-folded cartons, i.e. the teeth are held between the stacks and the orientation of the teeth are governed by the orientation of the stacks. In this way, the orientation of the teeth will not disturb the merging of the stacks. At the outfeed region, the stacks of flat-folded cartons leave the teeth and the conveyor track to first a sliding track and then to an outfeed conveyor which transports the stacks to e.g. a carton erecting station. A tooth is provided on a pusher member and the tooth is provided with a bearing surface and a pushing surface.

The teeth of the feeding device can be positioned in either a folded position in which the bearing surface of a tooth lays below the bearing plane of the conveyor track, or in an erected position in which the tooth extends above the bearing plane. In this way, it is possible to extend the distance between erected teeth in a row of teeth to correspond to the length of a stack of flat-folded cartons that are to be used. In one example, where the distance between the teeth are 100 mm, it is e.g. possible to support stacks that are 200 mm long by positioning every second tooth in a row in an erected position, or to support stacks that are 500 mm long by positioning every fifth tooth in a row in an erected position. The feeding device comprises a switch adapted to fold a tooth to a selected position.

In one example, the feeding device comprises a slide rail in the return path that sets all teeth in the folded position. In this case, the switch will switch selected teeth from the folded position to the erected position. The feeding device may further comprise an erecting member in the return path arranged after the slide rail, where the erecting member sets all teeth in the erected position. In this case, the switch will switch selected teeth from the erected position to the folded position.

The switch may fold the teeth in a parallel set of teeth at the same time, or may fold every tooth individually. By folding every tooth separately, it is possible to use only some of the rows of teeth. In one example, where the feeding device is provided with three rows of teeth, it is possible to use only two adjacent rows of teeth for smaller cartons having a smaller width. In this example, all teeth of one row of teeth are folded down.

A roller of a tooth is supported by a guide track arranged along the bearing plane of the conveyor track. Here, the teeth are either erected or folded. At the end region of the conveyor track, the rollers will leave the guide track such that the teeth will be unsupported, and will be able to pivot freely around the pivot point of the pushing member. This will allow for a tooth to withdraw from a stack of flat-folded cartons in a vertical direction and in a gentle way, without displacing or disturbing the stack of flat-folded cartons. The stacks of flat-folded cartons will in this way join each other to a longitudinal flow of flat-folded cartons to the outfeed conveyor. The conveying speed of the feeding device is preferably adapted to the pick-up speed of the carton erecting machine at the outfeed region.

In the shown feeding device, all teeth are folded to a folded state in the return path of the feeding device. This will save space at the first part of the return path. All teeth are then erected by an erecting member arranged in the return path. Thereafter, the switch will either leave the tooth erected, or will fold the tooth to a folded state, depending on the desired distance between erected teeth. By erecting all teeth, it is ensured that all teeth have the same orientation, and the switch can be made simple since it does not have to both erect and fold teeth. In the shown example, the switch will only fold the teeth that needs to be folded. In another example, no erecting member is used and the switch is positioned inside the conveyor chains, and the switch will only erect the teeth that should be erected.

When a tooth is folded, the pushing surface of the tooth will cover the void between two conveyor chains or the void between a conveyor chain and a side rail of the feeding device. The pusher member is also provided with a cover surface that will cover the void if a tooth is erected. In this way, there is no possibility for a person to e.g. accidentally insert a finger in the conveyor path.

In a method for feeding stacks of standing flat-folded cartons by a feeding device from an infeed region of the feeding device to a receiving station where the stacks are merged, where the feeding device is adapted to convey stacks having different lengths, and where the stacks are conveyed by a conveyor track comprising a plurality of teeth, the steps of: determining the length of a stack of flat-folded cartons that is to be conveyed by the feeding device and save the length in a control unit, setting a selected number of teeth to an erected position in dependency of the determined length of the stack of flat-folded cartons, inserting a stack of flat-folded cartons between the teeth at the infeed region, holding the teeth in the selected position by a guide track arranged along a bearing plane of the conveyor track, releasing the teeth from the selected position at an end region of the feeding device, such that the teeth are unsupported by a guide track, and such that the teeth are supported by the stacks of flat-folded cartons, withdrawing the teeth in a vertical orientation, and merging the stack with previous stacks at an outfeed region of the feeding device are comprised.

By the inventive method, stacks of flat-folded cartons having different lengths can be conveyed and merged by the feeding device. This allows for a flexible feeding device that can easily be adapted to stacks of flat-folded cartons of differing lengths. In this way, a production line can be used for different types of cartons, e.g. regular rectangular cartons and five panel cartons. The feeding device can also be adapted to cartons having different widths.

BRIEF DESCRIPTION OF DRAWINGS

The invention will be described in greater detail in the following, with reference to the embodiments that are shown in the attached drawings, in which.

DETAILED DESCRIPTION OF THE PREFERRED EMBODIMENTS

The embodiments of the invention with further developments described in the following are to be regarded only as examples and are in no way to limit the scope of the protection provided by the patent claims. The use of directional specifications, such as front, rear, up, down, forwards, etc., refers to the orientation of the stack of cartons. The bearing plane for the stack of cartons is in the shown example referred to as being horizontal, even if the bearing plane could be angled somewhat, by e.g. 10-20 degrees.

Figure 1:
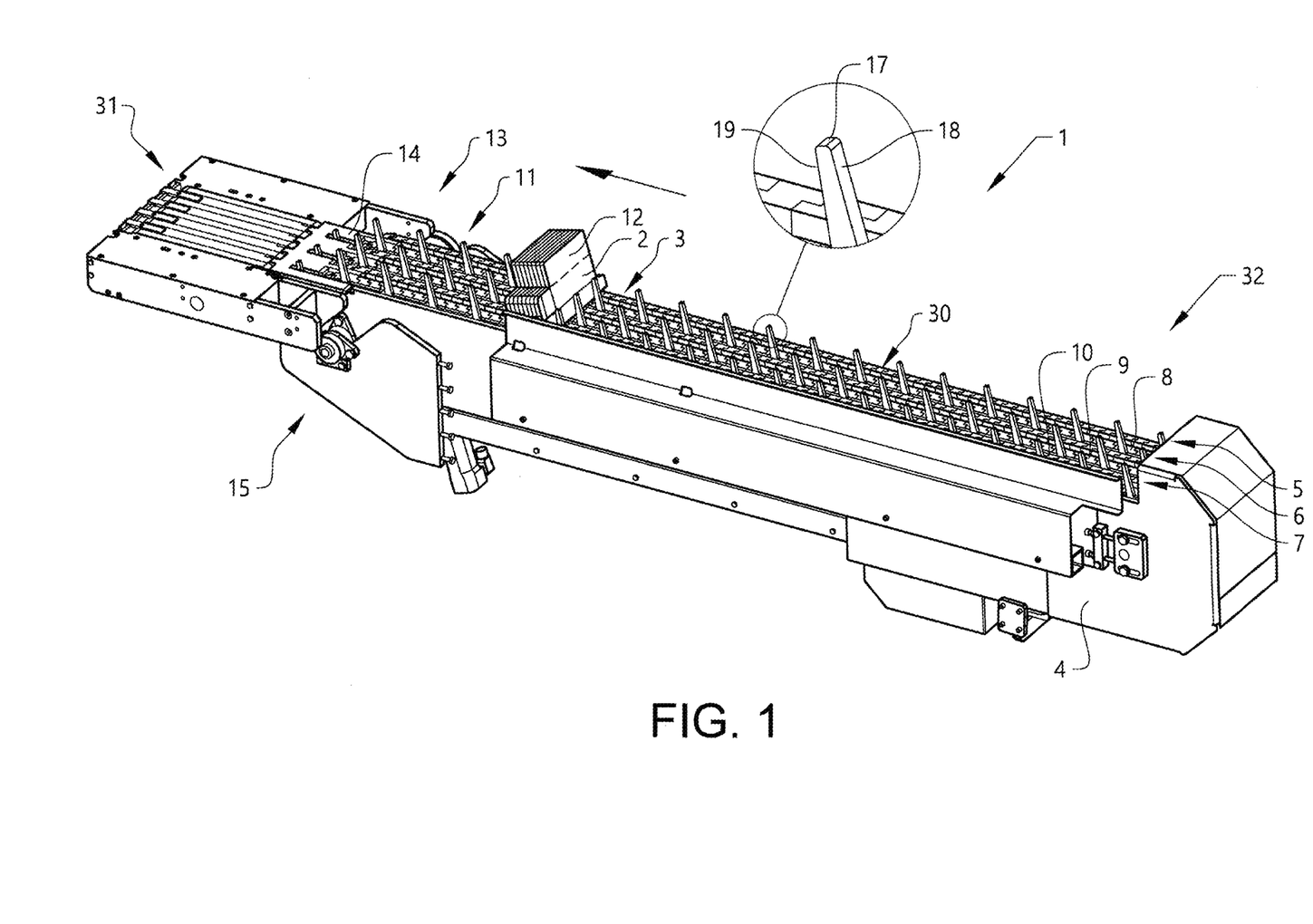
FIG. 1 shows a view of a feeding device configured for short cartons stacks according to the invention.
Figure 2:
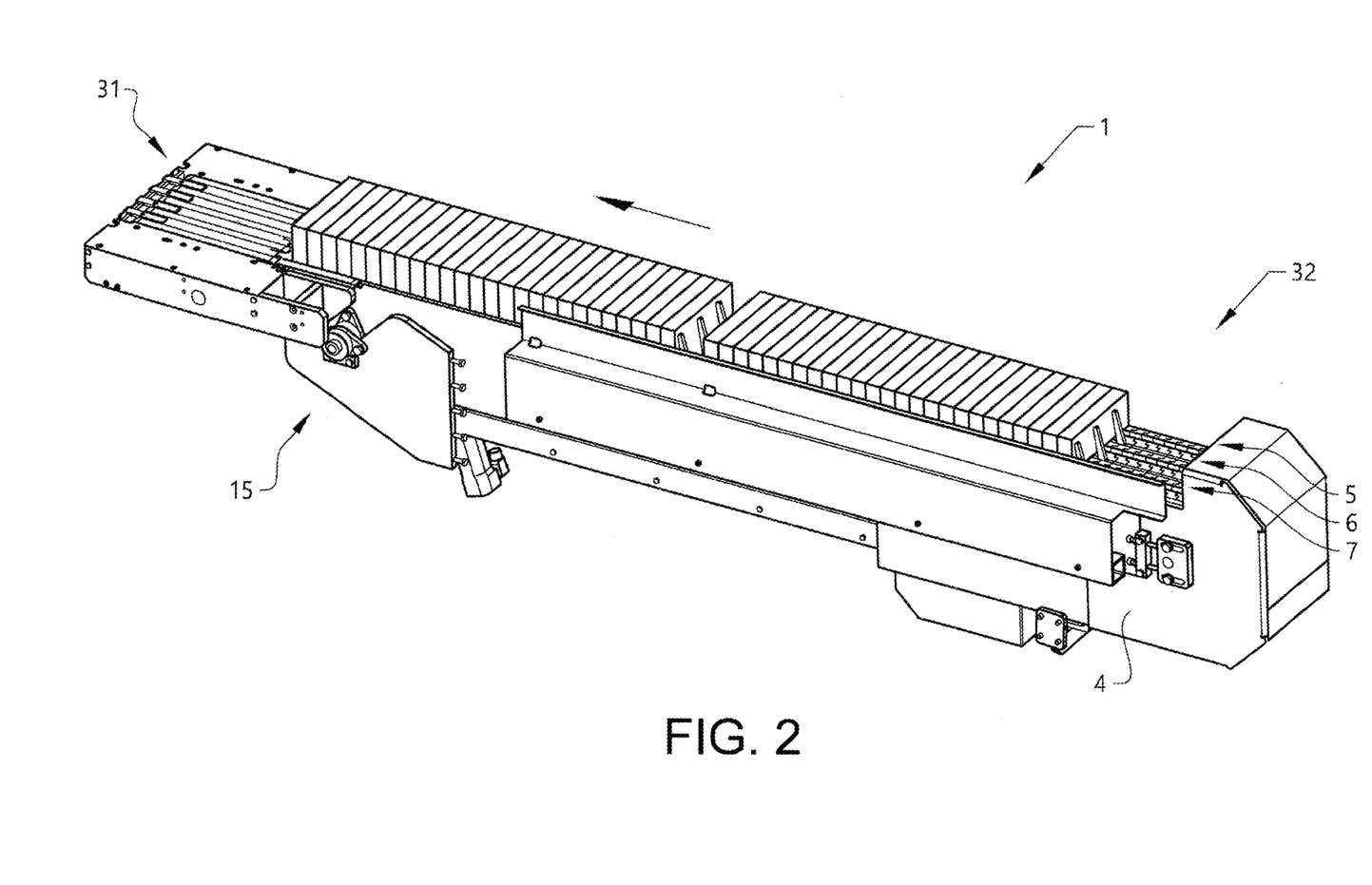
FIG. 2 shows a view of a feeding device configured for long cartons stacks according to the invention.
Figure 3:
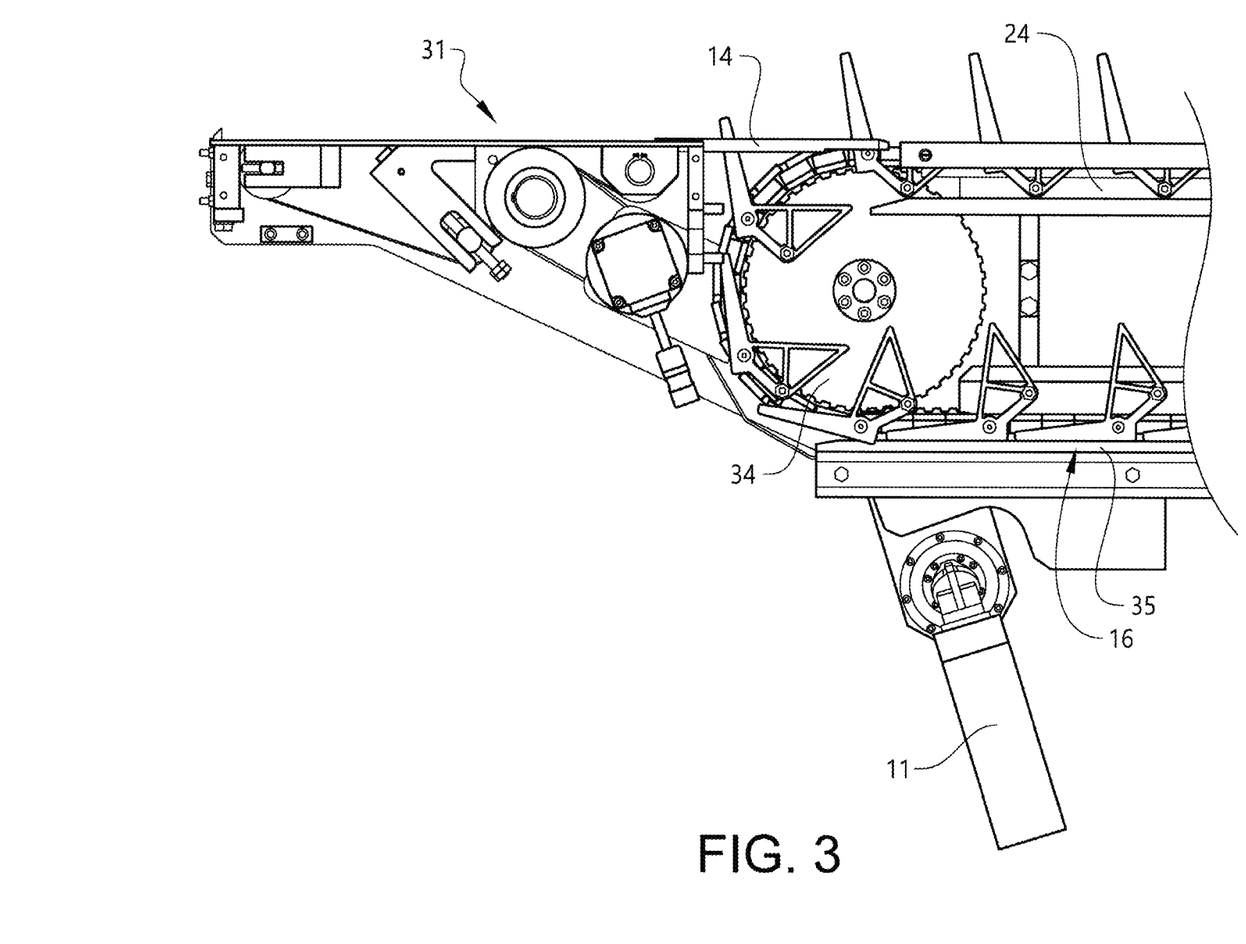
FIG. 3 shows a detail of the outfeed region of the feeding device according to the invention.
Figure 4:
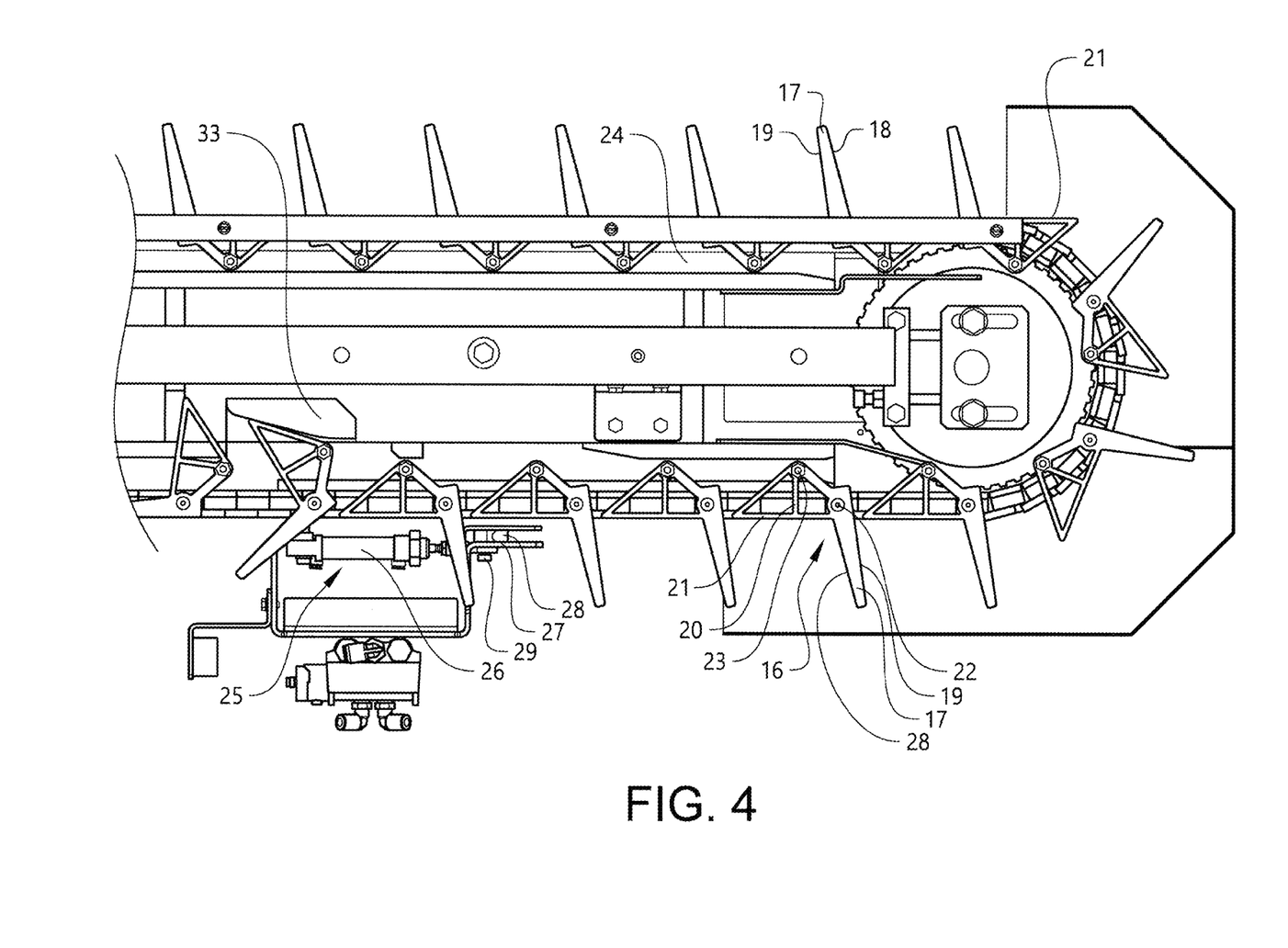
FIG. 4 shows a detail of the infeed region of the feeding device according to the invention.
Figure 5:
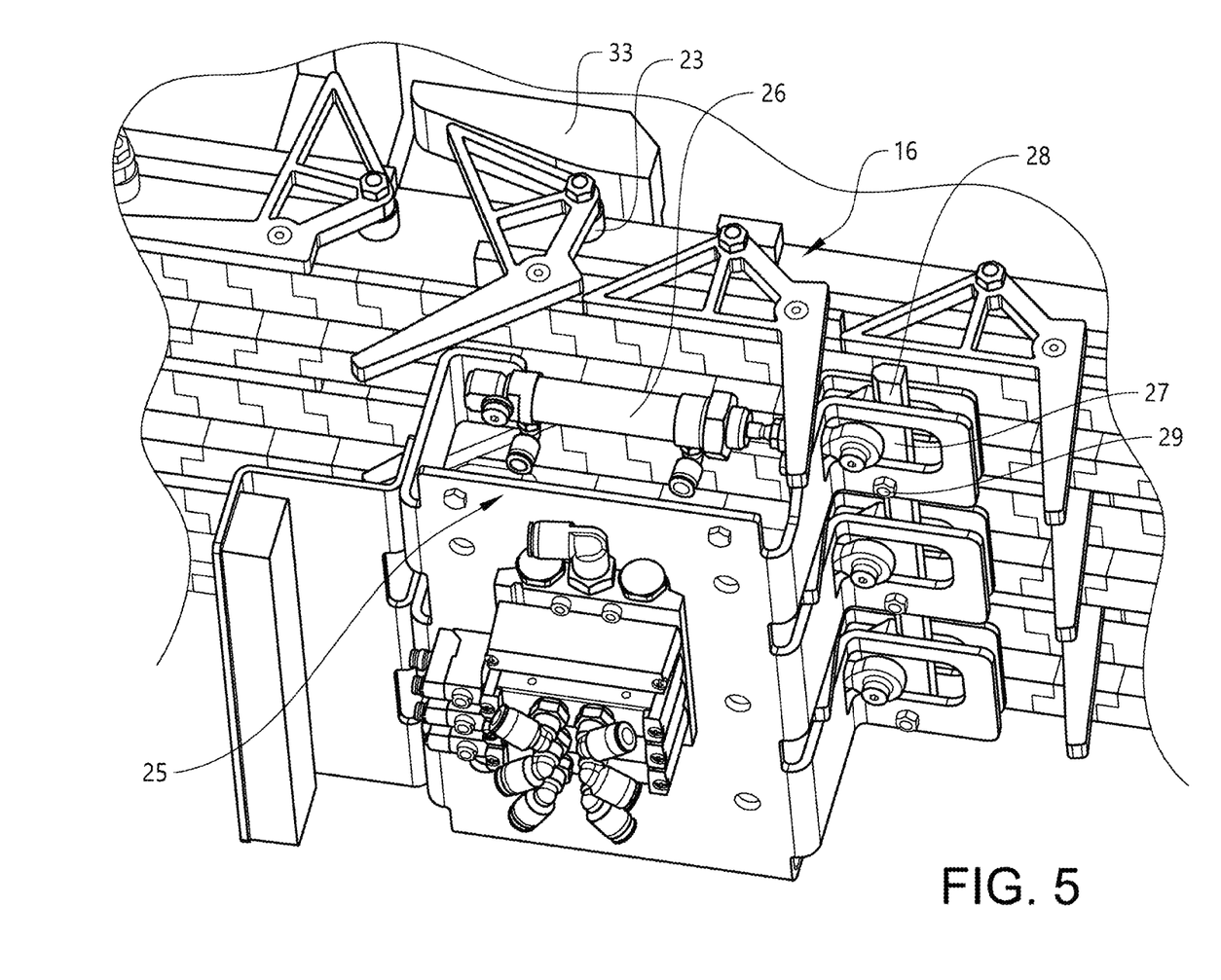
FIG. 5 shows a detail of the switch of the feeding device according to the invention.
Figure 6:
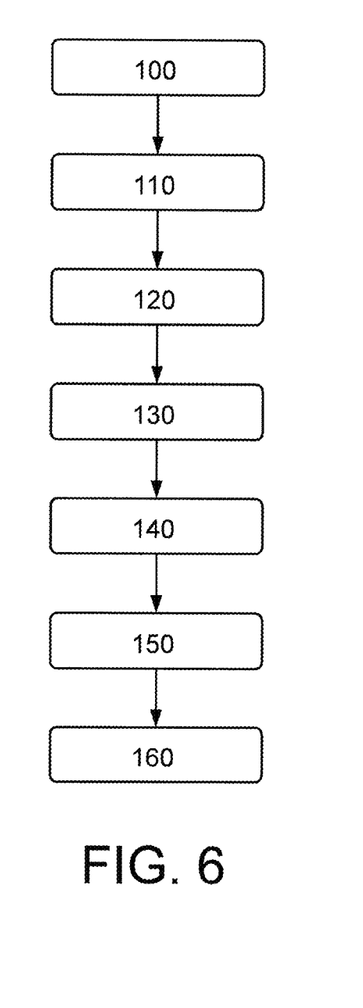
FIG. 6 shows a flowchart of a method for feeding stacks of flat-folded cartons according to the invention.

FIGS. 1 and 2 show views of a feeding device, FIGS. 3 to 5 show details of the feeding device, and FIG. 6 shows a flowchart of a method for feeding stacks of flat-folded cartons to a receiving station. The feeding device 1 according to the invention comprises a straight conveyor track 30 having a flat bearing plane 3 adapted to feed stacks of standing flat-folded cartons 2 from an infeed region 32 to an outfeed region 13, where adjacent stacks conveyed by the feeding device are merged with each other to form a long continuous stack of flat-folded cartons. The carton stacks 2 are forwarded to a receiving station, e.g. a carton erecting machine, through an outfeed conveyor 31 via a sliding track 14 which bridges the conveyor track 30 and the outfeed conveyor 31. The conveyor track comprises a plurality of protruding teeth 17 that will support the stacks of flat-folded cartons.

The conveyor track comprises at least two rows of teeth. In the shown example, the conveyor track comprises three rows of teeth, a first row of teeth 5, a second row of teeth 6 and a third row of teeth 7. The first row of teeth 5 is attached to a first conveyor chain 8, the second row of teeth 6 is attached to a second conveyor chain 9 and the third row of teeth 7 is attached to a third conveyor chain 10. The first, the second and the third conveyor chain are driven in parallel by the same drive unit 11 such that they move at the same speed, and such that the teeth positioned next to each other move at the same time. The teeth of each row of teeth are positioned side by side, such that three teeth arranged next to each other form a bearing plane perpendicular to the moving direction of the conveyor track.

The stacks of flat-folded cartons are inserted between the teeth at the infeed region. The stacks of flat-folded cartons are inserted between the teeth, either manually by an operator, or by a placing device, e.g. an industrial robot. The teeth are in the shown example slightly angled in a forward direction with respect to a vertical plane, such that the stack will bear against the bearing surface 18 of the teeth arranged next to each other. The teeth may also be perpendicular to the bearing plane or may be slightly angled in a rearward direction with respect to a vertical plane, depending on e.g. the type of used cartons. The stack of flat-folded cartons may expand when it has been inserted between the teeth, such that the stack of flat-folded cartons also bear against the pushing surfaces 19 of the following teeth.

The stacks of flat-folded cartons are conveyed to the outfeed region 13, where the stacks will slide on a sliding track 14 when the conveyor track turns downwards to the return path. Following the sliding track is an outfeed conveyor 31, e.g. a short belt conveyor, which actively transports the stacks to e.g. a carton erecting station. At the sliding track and the outfeed conveyor, the stacks of flat-folded cartons are merged to a continuous flow of flat-folded cartons (not shown). The speed of the conveyor track is e.g. adapted to the pick-up speed of cartons at the carton erecting station, such that the density of flat-folded cartons is approximately constant on the outfeed conveyor, and such that no extra buffer is required. It is e.g. possible to control the drive unit 11 of the feeding device with the pick-up speed of the carton erecting machine.

A tooth 17 is arranged on a pushing member 16, shown in FIG. 4. The pushing member is attached to a conveyor chain at a pivot point 22, e.g. with a screw such that it is possible to replace the pushing member. The pushing member comprises a tooth 17 arranged on one side of the pivot point 22, and a frame 20 arranged at the other side of the pivot point. The frame comprises a cover surface 21. A roller 23 is mounted on the frame. The roller is adapted to hold the tooth in the selected position, and is adapted to run in a guide track 24. The roller may comprise a slide bearing or a roller bearing.

A tooth 17 can be positioned in two positions, an erected position or a folded position. In the erected position, the tooth protrudes from the bearing plane of the conveyor track. In the folded position, the tooth is arranged below the bearing plane of the conveyor track, with the pushing surface 19 close to the bearing plane. In this position, the pushing surface will cover the area between two conveyor chains and the pivot points of two adjacent pushing members. This will cover the void created between the conveyor chains and will prevent e.g. a finger or other object to be caught in the conveyor track. When a tooth is erected, the cover surface 21 of the frame will cover this void. At the bearing plane, the roller will be guided in a guide track 24 arranged in parallel with the bearing plane 3, and will securely hold the tooth either in the erected position or in the folded position.

At the end region 15, shown in FIG. 3, the guide track 24 ends, and the tooth is released from its predefined position. When the tooth is in the erected position, the tooth will continue with a slightly angled direction, and will be guided by the stacks of flat-folded cartons. The tooth will at the same time leave the bearing plane downwards in a substantially vertical orientation, and the stack of flat-folded cartons will join the previous stacks of flat-folded cartons at the sliding track 14. The group of flat-folded cartons will be pushed forwards by the following teeth at the sliding track.

At the outfeed region, the conveyor track 30 runs on a drive wheel 34 to the return path. Here, the teeth are free-floating and the rollers are not controlled by a guide track. When the teeth reach the return path, all teeth are set to a predefined position, in the shown example to a folded position, where the pushing surface 19 bears against a slide rail 35. At an intermediate position of the return path, all teeth are in the shown example erected to an erected state by an erecting member 33, such that all teeth have the same orientation.

A switch 25, shown in FIG. 5, is arranged at the return path for each row of foldable teeth, where a switch comprises a switch cylinder 26, a switch member 27 and an actuating tab 28. The switch member is arranged at a pivot point 29, around which the switch member can pivot when the cylinder extends or retracts. When the cylinder is retracted, the switch will be in an active state in which the actuating tab will extend into the path of the erected teeth. When the cylinder is extended, the switch will be in a passive state in which the actuating tab is pivoted away from the path of teeth. With the switch in the active state, the pushing surface 19 of a tooth will hit the actuating tab and will be pushed to a folded state. With the switch in the passive state, the tooth will continue in the erected state.

In this way, the state of each tooth can be controlled by the switches. The distance between two erected teeth can be set to the length of a stack of flat-folded cartons. In the example shown in FIG. 1, the longitudinal distance between each tooth is e.g. 100 mm. By positioning every second tooth in an erected position, the feeding device will be adapted to handle stacks of flat-folded cartons having a length of 200 mm. In this way, the feeding device can be adapted to several different stacks of flat-folded cartons having different lengths. It is e.g. possible to use the feeding device for stacks of flat-folded cartons of the five panel type, where a stack is 100 mm long, and at another moment for stacks of regular flat-folded cartons, where a stack may be e.g. 500 mm long. FIG. 2 shows an example of a feeding device adapted for long stacks of folded cartons. In this example, only a few teeth are positioned in an erected position by the switch.

It is also possible to use only two rows of foldable teeth for smaller flat-folded cartons that are not as wide as the conveyor track. It is e.g. possible to erect teeth in two adjacent rows of teeth, and to let the third row of teeth be constantly in a folded state. This will allow the feeding device to be used for smaller cartons, or cartons having an odd shape, e.g. with an extended side flap. In the shown example, separate switches are used for each row of teeth. The switch may also fold a parallel set of teeth at the same time, using a single switch member acting on all rows at the same time.

By erecting all teeth, it is ensured that all teeth have the same orientation, and the switch can be made simple since it does not have to both erect and/or fold each tooth. In the shown example, the switch will only fold the teeth that needs to be folded. In another example, the switches could be positioned inside the conveyor chains. In such a case, an erecting member would not be used and all teeth would arrive to the switches in a folded state. The switch would in this case only erect the teeth that should be erected.

In the inventive method for feeding stacks of standing flat-folded cartons by a feeding device from an infeed region of the feeding device to a receiving station where the stacks are merged, the feeding device is adapted to convey and merge stacks having different lengths. The stacks are conveyed by a conveyor track comprising a plurality of teeth.

In step 100, the length of the stacks of flat-folded cartons that are to be conveyed by the feeding device is determined and is saved in a control unit for the feeding device.

In step 110, a selected number of teeth of the conveyor track are consecutively set to an erected position with a positioning device in the return path of the conveyor track. The selected number of teeth are set in dependency of the determined length of a carton stack. The length of a stack sets the distance between two erected teeth, which determines the required position for each tooth. With a short stack, all teeth may have to be erected. With a longer stack, some of the teeth must be folded, such that the distance between two erected teeth corresponds to the length of the stack.

In step 120, a stack of flat-folded cartons is inserted between the teeth at the infeed region. A stack may be inserted by hand or by a stack placing machine.

In step 130, the teeth are held in the selected position by a guide track arranged along the bearing plane of the conveyor track.

In step 140, the teeth are released from the selected position at an end region of the feeding device, such that the teeth are unsupported by a guide track, and such that the teeth are supported by the stacks of flat-folded cartons. In this way, the teeth will not push on, disturb or damage the stacks of flat-folded cartons at the outfeed region. The stack of flat-folded cartons merges with the previous stacks. Here, the teeth stop pushing the stack of flat-folded cartons, and the stack is merged with the next stack and the complete merged stack of flat-folded cartons is pushed by the teeth of that stack.

In step 150, the teeth are withdrawn in a vertical orientation. The teeth of the conveyor track leaves the guide track and the teeth retracts downwards to the return path.

In step 160, the stack will merge with previous stacks at the outfeed region of the feeding device.

In an additional step, the speed of the conveyor track is adjusted to a pick-up speed at the receiving station. The pick-up speed may e.g. be the speed at which a carton erecting machine picks up folded cartons from the merged pack of folded cartons. In this way, the density of flat-folded cartons at the outfeed track will be more or less constant, which will provide a sufficient forward pressure on the foremost carton, such that a reliable pick-up of the carton is ensured. At the same time, it is ensured that the flat-folded cartons will keep their standing orientation such that they don't fall over or tilt too much.

The invention is not to be regarded as being limited to the embodiments described above, a number of additional variants and modifications being possible within the scope of the subsequent patent claims.

REFERENCE SIGNS

1: Feeding device
2: Stack of flat-folded cartons
3: Bearing plane
4: Housing
5: First row of teeth
6: Second row of teeth
7: Third row of teeth
8: First chain
9: Second chain
10: Third chain
11: Drive unit
12: Display tab
13: Outfeed region
14: Sliding track
15: End region
16: Pushing member
17: Tooth
18: Bearing surface
19: Pushing surface
20: Frame 21: Cover surface
22: Pivot point
23: Roller
24: Guide track
25: Switch
26: Switch cylinder
27: Switch member
28: Actuating tab
29: Pivot point
30: Conveyor track
31: Outfeed conveyor
32: Infeed region
33: Erecting member
34: Drive wheel
35: Slide rail

What is claimed is:

1. A feeding device for feeding stacks of standing flat-folded cartons to a receiving station, comprising:
   a conveyor track having a flat bearing plane adapted to support the stacks,
     wherein the conveyor track comprises at least two rows of teeth
     wherein each row of teeth comprises a plurality of spaced apart teeth adapted to support the stacks of flat-folded cartons, and
     wherein the teeth are configured to be positioned in either an erected position or in a folded position;
   a guide track arranged along the bearing plane and adapted to hold the teeth in a selected position, wherein the guide track ends at an end region of the conveyor track, such that the teeth are unsupported at the end region;
   a slide rail in a return path, wherein the slide rail is adapted to set all teeth in the folded position;
   an erecting member in the return path adapted to set all teeth in the erected position;
   a switch adapted to switch selected teeth from the erected position to the folded position.

2. The feeding device according to claim 1, further comprising a switch adapted to switch selected teeth from the folded position to the erected position.

3. The feeding device according to claim 1, further comprising a pushing member, wherein a tooth is provided on the pushing member.

4. The feeding device according to claim 3, wherein the pushing member is attached to the conveyor track at a pivot point, with the tooth at one side of the pivot point and a frame is arranged at the other side of the pivot point.

5. The feeding device according to claim 4, wherein the frame comprises a cover surface adapted to fill a gap in the conveyor track when a tooth is erected.

6. The feeding device according to claim 1, further comprising a sliding track at an outfeed region, adapted to support stacks that are merged at the end region of the feeding device.

7. The feeding device according to claim 1, further comprising an outfeed conveyor arranged at an outfeed region, adapted to convey merged stacks of flat-folded cartons to the receiving station.

8. The feeding device according to claim 1, wherein the speed of the conveyor track is adapted to a pick-up speed at the receiving station.

9. A method for feeding stacks of standing flat-folded cartons by a feeding device from an infeed region of the feeding device to a receiving station where the stacks are merged, wherein the feeding device is adapted to convey stacks having different lengths, and wherein the stacks are conveyed by a conveyor track comprising a plurality of teeth, comprising:
   determining the length of a stack of flat-folded cartons that is to be conveyed by the feeding device and save the length in a control unit;
   setting a selected number of teeth to an erected position in dependency of the determined length of the stack of flat-folded cartons;
   inserting a stack of flat-folded cartons between the teeth at the infeed region,
   holding the teeth in the selected position by a guide track arranged along a bearing plane of the conveyor track;
   releasing the teeth from the selected position at an end region of the feeding device, such that the teeth are unsupported by a guide track, and such that the teeth are supported by the stacks of flat-folded cartons;
   withdrawing the teeth in a vertical orientation; and
   merging the stack with previous stacks at an outfeed region of the feeding device;
   wherein all teeth are set to an erected position in a return path of the feeding device, and a selected number of teeth are set to a folded position by a switch.

10. The method according to claim 9, wherein all teeth are set to a folded position in a return path of the feeding device, and a selected number of teeth are set to an erected position by a switch.

11. The method according to claim 9, further comprising adjusting the speed of the conveyor track to a pick-up speed at the receiving station.

\* \* \* \* \*